United States Patent [19]
Nguyen et al.

[11] Patent Number: 5,712,851
[45] Date of Patent: Jan. 27, 1998

[54] ADAPTIVE TIME SLOT SCHEDULING APPARATUS AND METHOD UTILIZING A LINKED LIST MECHANISM

[75] Inventors: Chinh Kim Nguyen, San Diego, Calif.; Sunder Raj Rathnavelu, Marlboro, N.J.; Don Tipon, San Diego, Calif.

[73] Assignee: Lucent Technologies Inc., Murray Hill, N.J.

[21] Appl. No.: 579,961

[22] Filed: Dec. 28, 1995

[51] Int. Cl.$^6$ .................................................. H04L 12/56
[52] U.S. Cl. ................................................ 370/399; 370/418
[58] Field of Search .................................... 370/395, 397, 370/399, 412, 417, 418, 409

[56] References Cited

U.S. PATENT DOCUMENTS

| 4,763,319 | 8/1988 | Rozenblit | 370/397 |
| 5,452,296 | 9/1995 | Shimizu | 370/399 |

Primary Examiner—Benedict V. Safourek

[57] ABSTRACT

An apparatus an method for adaptive time slot scheduling of communications traffic generated by end-point host in ATM network. The scheduler includes a time slot ring including an array of time slots, wherein each of said time slots includes a virtual channel identifier (VCID) of a virtual channel (VC) to be serviced; a VC table including an array of VC descriptors, wherein the VCID stored in said time slot ring points to a VC descriptor in the VC table; and processor for scheduling the VCs in said time slots of said time slot ring, wherein the time slots ring are circularly processed in a continuous fashion thereby enabling scheduled transmission of ATM cells in the network. The processor is operable to queue the VCID of a newly calculated target slot in an already occupied time slot if the newly calculated target slot is occupied, thereby creating a linked list of VCs, and the processor is operable to service all VCs at a single time slot before proceeding to a next time slot.

17 Claims, 2 Drawing Sheets

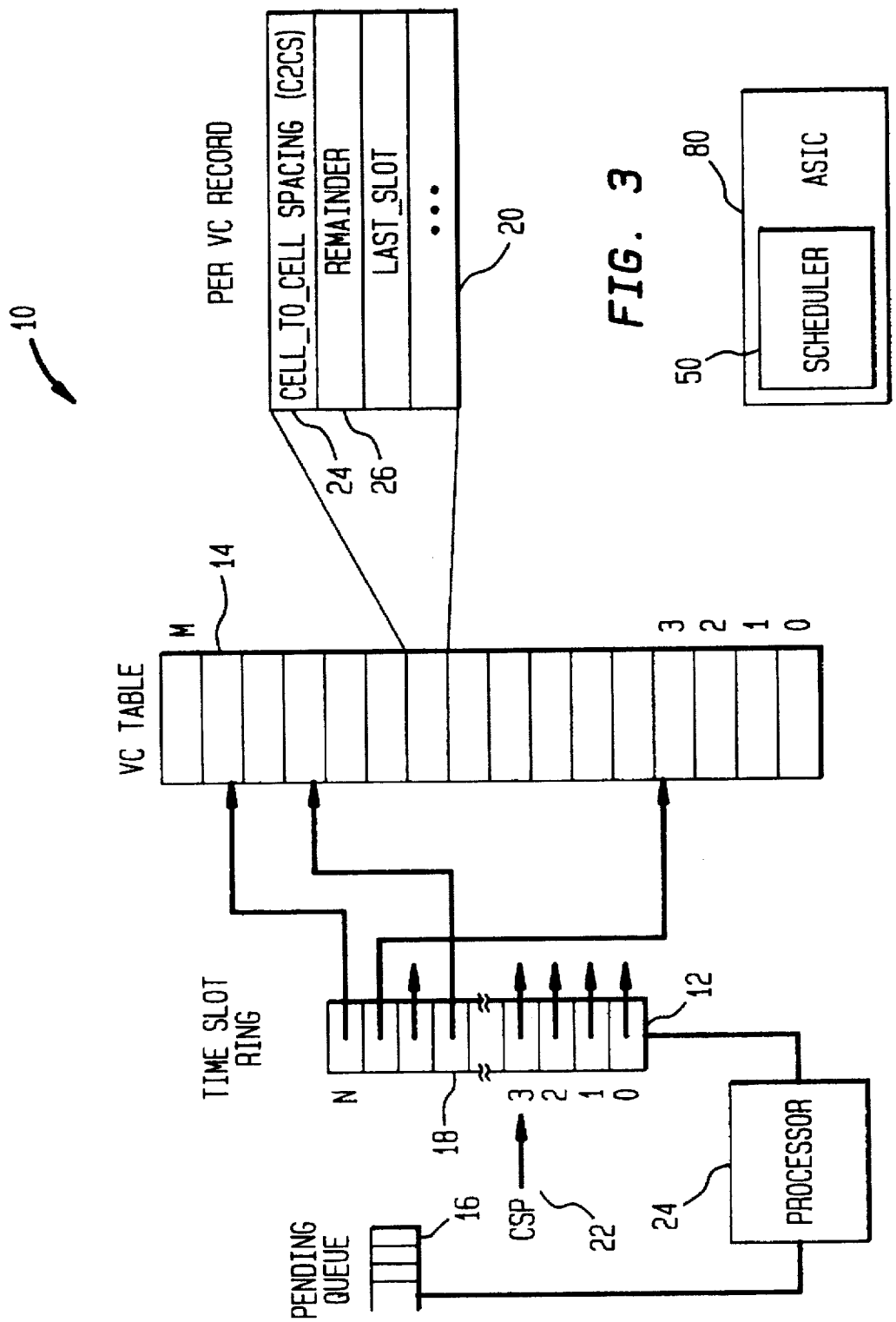

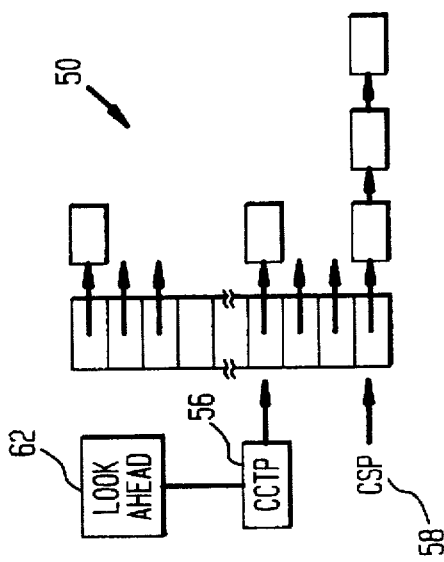
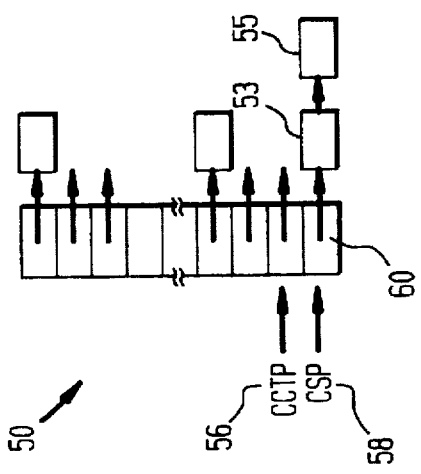
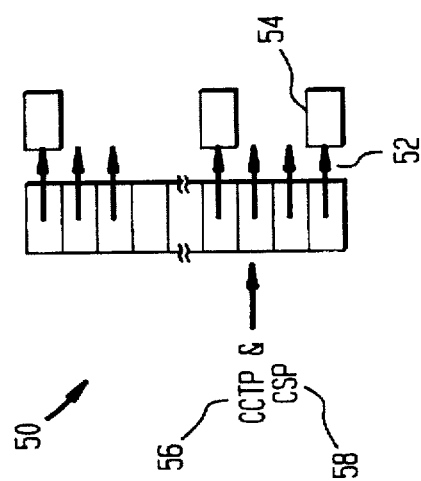

ADAPTIVE TIME SLOT SCHEDULING APPARATUS AND METHOD UTILIZING A LINKED LIST MECHANISM

RELATED APPLICATIONS

The present patent application is related to U.S. patent application Ser. No. 08/579,961, entitled ADAPTIVE TIME SLOT SCHEDULING APPARATUS AND METHOD FOR END-POINTS IN AN ATM NETWORK, having a filing date of Dec. 28, 1995, that application having a common assignee and one or more common inventors and being incorporated herein by reference.

FIELD OF THE INVENTION

The present invention relates generally to the field of telecommunications systems, and more particularly to an adaptive time slot scheduling scheme for end-points in ATM networks.

BACKGROUND OF THE INVENTION

Asynchronous Transfer Mode (ATM) networks allow a large number of data flow paths or Virtual Channels (VCs) to be statistically multiplexed over a common link. A high speed ATM connection allows a host end-point device, for example, a computer, to have a large number of simultaneous virtual channels sharing bandwidth of the common link. A challenge in implementing the large number of virtual channels is to achieve specified Quality of Service (QOS) for each virtual channel independent of other virtual channels. The challenge is compounded when a mix of virtual channels with differing requirements for the QOS have to be satisfied.

In order to efficiently accommodate the differing QOS requirements of multiple virtual channels, a scheduler in an end-point device should be able to respond quickly to changes in transmission rates on the individual virtual channels. This is required, for example, for the Variable Bit Rate (VBR) and the best effort or Available Bit Rate (ABR) classes of service. The scheduler should also be able to dynamically adjust the scheduling when new virtual channels are added or old ones are removed or existing virtual channels stop or start sending data temporarily. In addition, the scheduler should also minimize the jitter, that is, changes in time interval between cells. This is important because ATM switches, which receive streams of cells generated by the scheduler, continuously monitor each VC using a leaky bucket algorithm or Generic Cell Rate Algorithm (GCRA) to check if the switch is adhering to the traffic contract. In the event the leaky bucket overflows, the cells can potentially be dropped by the switch. Accordingly, the scheduler should protect against this by minimizing the jitter. In case of constant bit rate (CBR) channels, a buffer is required at the receiving end to remove the jitter and smooth the incoming flow of cells. Increased jitter will then require a larger buffer.

Scheduling schemes have been proposed in the prior art for scheduling VCs within a switch and within an end-point. Heretofore, these schemes have been unable to meet the requirements necessary for efficient implementation of multiple virtual channels having various transmission rates and differing QOS guarantees. Accordingly, there is a need for a scheduling mechanism capable of implementing specified transmission rates for each virtual channel independent of other virtual channels, wherein the virtual channels include a mix of differing QOS requirements.

SUMMARY OF THE INVENTION

The present invention discloses an apparatus and method for adaptive time slot scheduling of communications traffic generated by an end-point host in an ATM network. Asynchronous Transfer Mode (ATM) networks allow a large number of Virtual Channels (VC s) to be statistically multiplexed over a common link. In order to satisfy the specified Quality of Service (QoS) for each VC, the present invention scheduler utilizes a time slot ring, wherein the scheduler dynamically fills in the various slots of the time slot ring with different VCs to be serviced.

In one preferred embodiment of the invention, the scheduler includes a time slot ring including an array of time slots, wherein each of said time slots includes a virtual channel identifier (VCID) of a virtual channel (VC) to be serviced; a VC table including an array of VC descriptors, wherein the VCID stored in said time slot ring points to a VC descriptor in the VC table; and processing means for scheduling the VCs in said time slots of said time slot ring, wherein the time slots are circularly processed in a continuous fashion thereby enabling scheduled transmission of ATM cells in the network. The processing means is operable to queue the VCID of a newly calculated target slot in an already occupied time slot if the newly calculated target slot is occupied, thereby creating a linked list of VCs, and the processing means operable to service all VCs at a single time slot before proceeding to a next time slot.

BRIEF DESCRIPTION OF THE FIGURES

For a better understanding of the present invention, reference may be had to the following description of exemplary embodiments thereof, considered in conjunction with the accompanying drawings, in which:

FIG. 1 shows a diagram of basic elements included in an adaptive time slot scheduling mechanism; and FIGS. 2A–2C shows one preferred embodiment of a time slot ring according to the present invention; and FIG. 3 shows the scheduling mechanism of the present invention included as part of an applications specific integrated circuit (ASIC).

DETAILED DESCRIPTION

Referring to FIG. 1, there is shown a block diagram illustrating an exemplary embodiment of a scheduling mechanism 10. The scheduling mechanism of FIG. 1 is described in detail in related copending U.S. patent application Ser. No. 08/579,961, entitled ADAPTIVE TIME SLOT SCHEDULING APPARATUS AND METHOD FOR END-POINTS IN AN ATM NETWORK. As shown, the scheduling mechanism or scheduler 10 is contained, for example, in an end-point host of an ATM network. The scheduler 10 includes three basic components, a time slot ring 12, a VC table 14 and a pending queue 16. The time slot ring 12 is essentially an array found in memory, for example, wherein each element in the array represents a specific time slot 18. Each time slot 18 contains a pointer which includes the virtual channel identifier (VCID) that identifies the virtual channel to be serviced in this time slot. The VCID points to a VC descriptor 20 in the VC table 14 which stores all the information regarding the specific VC. If the slot 18 is empty, a null pointer is contained therein.

The VC descriptor 20 is contained in the VC table 14, wherein the VC table is essentially an array of all the VC descriptors. The pending queue 16 is a queue of VCIDs and is used for queuing a new VC. In addition, when the scheduler 10 is unable to find a time slot for a VC, the VC is queued in the pending queue 16. In one embodiment of the present invention, the scheduler is included as part of Segmentation and Reassembly (SAR) applications specific integrated circuit (ASIC) 80, as shown in FIG. 3.

In the basic operation of the scheduler 10 shown in FIG. 1, the scheduler 10 by means of a processor unit 24 reads and processes one slot at a time in the time slot ring at a predetermined rate, for example, the maximum speed that the physical link of the endpoint device will allow. The scheduler 10 then circularly services the slots in the ring 12 in a continuous fashion. A current slot pointer (CSP) 22 points to the slot being serviced. For a current time slot, i.e., the slot referenced by the CSP, the scheduler 10 first services the VC waiting on or waiting in this slot, the scheduler 10 then schedules a new target time slot for this VC after marking the current slot empty.

As can be seen from the above description, the functions of the scheduler and transmitter (for transmitting ATM cells) are essentially combined in the mechanism of FIG. 1. Since the scheduler 10 is servicing the ring 12 at the fixed outgoing link rate, the difference between the current slot and the previous slot in which a VC was serviced equals a cell-m-cell spacing measured in terms of the link cell rate. This parameter called the cell to cell spacing (C2CS) 24 is part of the VC descriptor 20 and is used by the scheduler 10 to achieve a given cell rate for each VC. As an example, if the link cell rate is LR cells/sec and the required cell rate for a VC is RCR cells/sec then the cell-to-cell spacing required is C2CS=LR/RCR.

When the scheduler 10 calculates a new target time slot, the scheduler first checks to see if the target slot is empty. If the target slot is empty, the current VCID is copied to the new slot. If the slot is not empty, i.e., a non-empty slot being indicative of a collision, the current VC is queued in the pending queue 16. This VC will be serviced later when the scheduler encounters an empty slot. If the current slot is found to be an empty slot, then the scheduler 10 checks the pending queue 16. If the pending queue 16 is non-empty, the first VC in this queue is serviced. If the pending queue 16 is also empty, an "unassigned" cell or a dummy cell is sent or transmitted on the output link.

Due to the fact that there may be collisions, and a VC may go into the pending queue 16, the cell-to-cell spacing of the shown embodiment will not exactly match the required cell-to-cell spacing. In order to correct the rate, a new viable called the remainder 26 is introduced in the VC descriptor 20. The scheduler 10 accumulates the difference between the required cell-to-cell spacing (C2CS) and the actual spacing (present slot minus previous slot) in this variable. When scheduling, the remainder is added to the C2CS to arrive at a corrected target slot. This "remainder" mechanism ensures that over the long term, the cell-to-cell spacing averages to the required spacing. This may also, however, result in an altering of the spacing between the cells, thereby producing jitter. This jitter is acceptable as long as the resulting cell stream passes the criteria of the GCRA (Generic Cell Rate Algorithm) being implemented, wherein the GCRA monitors that a specific device is adhering to its service contract.

As would be understood by a person skilled in the art, it is important to be able to change the cell rate of the scheduling mechanism for different services such as Variable Bit Rate (VBR) and Available Bit Rate (ABR). A change in the rate should not, however, involve undue overhead. The adaptive time slot scheduler 10 is particularly suited in this respect, in that changing the rate, is accomplished by simply changing the C2CS parameter in the VC descriptor 20. The scheduler 10 will start scheduling at the new rate starting with the next cell in the stream. This becomes clear when it is considered that a given VC is present at most in one slot in the time slot ring 12 at any given time.

Call admission, that is, the number of calls admitted over a link in the network, plays an important role in the effectiveness of a scheduling algorithm in its ability to ensure Quality of Service (QoS). Call admission is required to monitor the total amount of bandwidth that is taken by all the VCs combined and to make sure that the QoS values do not suffer. As would be understood, the number of collisions increases with an increase in the percentage utilization of the link. Thus, a call admission control found in a higher level of software limits the link utilization to a level which depends on the desired QoS.

As would be understood, the ring size is also very important for implementation of the present invention scheduling scheme. The number of slots in the time slot ring 12 is determined by the VC with the lowest cell rate. As an example, consider the requirement for a link speed of 622 Mbps (which translates to a cell rate of 1.41 Mcells/sec after considering the framing and ATM layer overheads). If a minimum rate of 64 Kbps is assumed, which translates to a cell rate of 170 cells/sec. The minimum ring size then becomes 1.41M/170=8294 slots. Accordingly, if a cell is sent once in every 8294 time slots, the effective rate for this VC will be 64 Kbps. Thus, a ring of this size is sufficient to support rates down to 64 Kbps. Ideally, the ring should be kept in an external control memory and the smaller the size of the ring the better in terms of meeting desired performance criteria. In a preferred embodiment of the invention the ring will be small enough to fit in an on-chip cache. This will save a large number of accesses to the external control memory.

When examining the adaptive time slot scheduling scheme described with respect to FIG. 1, it can be seen that the basic scheme described may very well have a significant collision rate, i.e., when the target slot is not empty, especially when the link utilization is high. In order to efficiently handle the collision rate, the present invention forms a linked list of VCs at the target slot and then uses a separate variable to keep track of the real time.

In a preferred embodiment of the present invention, as shown in FIG. 2A, when the scheduler 50 calculates a target slot and finds that the target slot is already occupied, the scheduler simply queues the target slot at this same slot to form a linked list 52 of VCs. The per VC record will now include a pointer 54 to the next VC in the linked list which will be used for this purpose. The scheduler 50 services all the VCs queued at a slot before proceeding to the next slot. A basic problem with this approach, however, is that the current position in the ring 12 no longer reflects the real time. Accordingly, the difference between the slot numbers can not be used to calculate the cell to cell spacing. In order to address this problem, a new variable called the Current Cell Time Pointer (CCTP) 56 is introduced. The CCTP 56 will increment to the next slot for every cell sent on the link, whereas the Current Slot Pointer (CSP) 58 will point to the slot which is being serviced. In calculating the cell to cell differences, the CCTP is used. As shown in example FIG. 2A, each slot has only one VC 54 queued up. In this case, the CCTP 56 and the CSP 58 will be exactly in step. The behavior of the scheduler, in this case will be the same as the embodiment described with respect to FIG. 1.

Referring to FIG. 2B, consider the case when a current slot 60 has two VCs 53,55 queued. When the scheduler 50 is servicing the second VC 55 at CSP in the queue, the CCTP 56 will advance to the next slot and the two pointers are no longer equal. In this situation, the scheduler is considered to be backlogged. This backlog condition, however, will eventually clear and the two pointers 56,58 will again be in step when the scheduler encounters empty slots which are used to compensate for the backlog condition. An admission control (not shown) ensures that the total bandwidth required by all the VCs combined does not exceed the link speed. In the present context, this means that if the scheduler is backlogged, the scheduler will encounter enough empty slots in order to compensate for the backlogged condition so that the pointers can be in step or in synchronization again.

As will be understood, when the scheduler 50 encounters an empty slot, the next action taken will depend on the action taken will depend on the state of the scheduler. In a normal state, the scheduler 50 will emit an unassigned cell, whereas in the backlogged case the scheduler will not emit any cell but will use the unassigned cells to compensate for the backlogged condition. This situation is illustrated in FIG. 2C, wherein the slot to which the CSP 58 points is backlogged with three VCs. As can be seen, when the scheduler 50 services all the VCs at the CSP 58, since it is backlogged, the scheduler must jump to the next non-empty position of CCTP 56. This involves reading all the intervening empty slots to arrive at the next non-empty slot, which is somewhat of a drawback, as the number of reads to the ring per cell time are not bounded. To solve this problem, a mechanism 62 is introduced to "look ahead" for empty cells. The look ahead mechanism requires that if the scheduler 50 is backlogged, the scheduler should read the slots at the CCTP and remember the first non-empty slot. When the current slot is serviced, the CSP of the scheduler should jump to this position.

In the preferred embodiment, when the scheduler 50 decides on a target slot and inserts the VC at this slot, the actual cell to cell difference when this VC is eventually serviced at this target slot may not equal the required spacing, because the scheduler may have to service many more VCs on the way. The remainder mechanism discussed with respect to the mechanism of FIG. 1 takes care of this and ensures that the average equals the required spacing. When a VC is queued at a target slot, the VC should logically be queued at the end of the queue. This requires maintaining a the tail pointer in addition to a head pointer. Due to the remainder mechanism, which corrects cell-to-cell spacing, the instant embodiment can be simplified to add the new entry at the head of the queue.

From the above, it should be understood that the embodiments described, in regard to the drawings, are merely exemplary and that a person skilled in the art may make variations and modifications to the shown embodiments without departing from the spirit and scope of the invention. All such variations and modifications are intended to be included within the scope of the invention as defined in the appended claims.

What is claimed is:

1. An apparatus for scheduling communications traffic from an end-point host over an ATM network, said apparatus comprising:

a time slot ring including an array of 1 through N time slots, wherein each of said time slots includes a virtual channel identifier (VCID) of a virtual channel (VC) to be serviced;

a VC table including an array of VC descriptors, wherein said VCID stored in said time slot ring points to a VC descriptor in said VC table; and processing means for scheduling said VCs in said time slots of said time slot ring, wherein said time slots are circularly processed in a continuous fashion such that a first time slot is the next to be processed after an Nth time slot thereby enabling scheduled transmission of ATM cells in said network, a newly calculated target time slot for a processed VC being calculated according to a cell spacing parameter, said processing means being operable to queue the VCID of said newly calculated target slot in an already occupied time slot, said newly calculated time slot if said newly calculated target slot is occupied, thereby creating a linked list of VCs, said processing means operable to service all VCs at a single time slot before proceeding to a next time slot, each said VC descriptor including a pointer variable to facilitate use of said linked list.

2. The apparatus of claim 1, further including a current slot pointer (CSP) for pointing to a current slot being serviced in said time slot ring and a current cell time pointer (CCTP), said CCTP operable to increment to a next slot in said time slot ring for every cell sent on said output link.

3. The apparatus of claim 2, wherein a backlog condition exists in said scheduling apparatus when said CSP differs from said CCTP, and a normal state exists when said CSP equals said CCTP, wherein said processing means emits an unassigned cell in said normal state upon encountering an empty slot in said time slot ring, and in said backlog condition said processing means utilizes said unassigned cell to compensate for said backlog condition.

4. The apparatus of claim 2, further including a look ahead mechanism operable in connection with said CCTP to identify a first non-empty slot in said time slot ring, wherein said current slot pointer (CSP) jumps to said first non-empty slot upon completely servicing a current slot.

5. The apparatus of claim 1, wherein each of said VC descriptors in said VC table includes a cell-to-cell spacing parameter for each VC, wherein said cell-to-cell spacing parameter is defined as the transmission rate of said output link divided by a required cell rate for said VC.

6. The apparatus of claim 5, wherein a cell rate in said time slot ring is altered for different QOS (quality of service) requirements by altering said cell to cell spacing parameter in said VC descriptor.

7. The apparatus of claim 1, further including a tail pointer for referencing a cell queued at the end of said linked list in a time slot.

8. The apparatus of claim 1, wherein a new VCID inserted in a queue of a target slot is inserted at the head of said queue.

9. The apparatus of claim 1, wherein said time slot ring is included in a segmentation and re-assembly (SAR) applications specific integrated circuit (ASIC).

10. A method for scheduling communications traffic from an end-point host over an ATM network, said method comprising the steps of:

providing a time slot ring including an array of 1 through N time slots, wherein each of said time slots includes a virtual channel identifier (VCID) of a virtual channel (VC) to be serviced;

referencing a VC table including an array of VC descriptors, wherein said VCID stored in said time slot ring points to a VC descriptor in said VC table, said VC descriptor including pertinent information regarding processing of a specific VC;

circularly processing said time slots of said time slot ring in a continuous fashion at a predetermined rate such that a first time slot is the next to be processed after an Nth time slot thereby enabling scheduled transmission of ATM cells in said network, a newly calculated target time slot for a processed VC being calculated according to a cell spacing parameter; and queuing the VCID of said newly calculated target slot in an already occupied time slot if said newly calculated target slot is occupied, thereby creating a linked list of VCs, said processing means operable to service all VCs at a single time slot before proceeding to a next time slot.

11. The method of claim 10, wherein said time slot ring includes a current cell time pointer (CCTP), further including the step of:

incrementing said CCTP to a next slot in said time slot ring for every cell sent on said output link.

12. The method of claim 11, wherein a backlog condition exists when said CSP differs from said CCTP, and a normal state exists when said CSP equals said CCTP, further including the steps of:

emitting an unassigned cell in said normal state upon encountering an empty slot in said time slot ring.

13. The method of claim 11, further including the step of:

identifying a first non-empty slot in said time slot ring by means of said CCTP, wherein a current slot pointer (CSP) jumps to said first non-empty slot upon completely servicing all VCs at a current slot.

14. The method of claim 10, wherein each of said VC descriptors in said VC table includes a cell-to-cell spacing parameter for each VC, wherein said cell-to-cell spacing parameter is defined as the transmission rate of said output link divided by a required cell rate for said VC, further including the step of altering a cell rate in said time slot ring for different QOS requirements by altering said cell-to-cell spacing parameter in said VC descriptor.

15. The method of claim 12, further including the step of utilizing said unassigned cell to compensate for said backlog condition.

16. The method of claim 10, further including the step of inserting a VCID at the head of a queue at said target slot.

17. The method of claim 10, further including the step of maintaining a tail pointer for referencing a cell queued at the end of said linked list in a time slot.

* * * * *